United States Patent [19]

Wank et al.

[11] Patent Number: 4,806,412

[45] Date of Patent: Feb. 21, 1989

[54] LAMINATES

[75] Inventors: Joachim Wank, Dormagen; Werner Waldenrath, Cologne; Rudolf Hombach, Leverkusen, all of Fed. Rep. of Germany

[73] Assignee: Bayer Aktiengesellschaft, Leverkusen, Fed. Rep. of Germany

[21] Appl. No.: 181,061

[22] Filed: Apr. 13, 1988

[30] Foreign Application Priority Data

Apr. 24, 1987 [DE] Fed. Rep. of Germany ....... 3713673
Jan. 28, 1988 [DE] Fed. Rep. of Germany ....... 3802471

[51] Int. Cl.[4] .................. B32B 9/00; B32B 15/00; B32B 21/00; B32B 27/38

[52] U.S. Cl. ................... 428/203; 428/319.3; 428/412; 428/414

[58] Field of Search .............. 428/203, 204, 412, 414, 428/319.3

[56] References Cited

U.S. PATENT DOCUMENTS 4,281,040 7/1981 Santiago .............................. 428/203
4,707,396 11/1987 Wank et al. ........................ 428/412

Primary Examiner—William J. Van Balen
Attorney, Agent, or Firm—Connolly and Hutz

[57] ABSTRACT

The invention relates to laminates of five or six components and to their use for the production of skis, surfboards and furniture components.

3 Claims, No Drawings

LAMINATES

This invention relates to 5 to 100mm thick laminates consisting of
1. a 0.1 to 0.8 mm thick film of a highly transparent, thermoplastic plastic,
2. a polyurethane layer tackfree at room temperature,
3. a decorative layer
4. an epoxy resin layer and
5. a 2 to 30 mm thick layer of substrate or core material of rigid polyurethane foam or aluminium.

Between the third and fourth layer there can be optionally incorporated another polyurethane layer 3a, tackfree at room temperature.

Thus the invention relates also to 5 to 100 mm thick laminates consisting of
1. a 0.1 to 0.8 mm thick film of a highly transparent thermoplastic layer,
2. a polyurethane layer tackfree at room temperature,
3. a decorative layer, 3 (a) a polyurethane layer tackfree at room temperature,
4. an epoxy resin layer and 5. a 2 to 30 mm thick layer of substrate or core material or rigid polyurethane foam or aluminium.

Laminates are known from DE-OS No. 3 528 812 (Le A 23 882), but these known laminates are not bonded to core materials, such as rigid polyurethane foam, wood or aluminium.

Films of thermoplastic suitable for the purposes of the invention are those of kown thermoplastic aromatic polycarbonates having weight average molecular weights $M_w$ of from 25,000 to 200,000, preferably from 30,000 to 120,000 and more preferably from 30,000 to 80,000 ($\overline{M}_w$ determined via $\eta_{rel}$ in $CH_2Cl_2$ at 20 C. in a concentration of 0.5 g per 100 ml). Other films of thermoplastic plastics suitable for the purposes of the invention are preferably those of known thermoplastic polyaryl sulfones which may be linear (see DE-OS No. 27 53 114) or branched (see DE-OS No. 27 35 092 and DE-OS No. 23 05 413).

Suitable linear polyaryl sulfones are any known aromatic polysulfones or polyether sulfones having weight average molecular weights ($\overline{M}_w$), as measured by light scattering, of from about 15,000 to about 55,000 and preferably from about 20,000 to about 40,000. Polyaryl sulfones of this type are described, for example, in DE-OS No. 17 19 244 and in U.S. Pat. No. 3,365,517.

Suitable branched polyaryl sulfones are, in particular, the branched polyaryl ether sulfones according to DE-OS No. 23 05 413 or U.S. Pat. No. 3,960,815 which have weight average molecular weights ($\overline{M}_w$), as measured for example by light scattering, of from about 15,000 to about 50,000 and preferably from about 20,000 to 40,000 (for further information, see DE-AS No. 30 10 143 (Le A 20 254)).

Other thermoplastic plastics suitable for the films of component 1 are, preferably, thermoplastic cellulose esters, thermoplastic polyvinyl chloride, thermoplastic styreneacrylonitrile copolymers and thermoplastic polymethyl methacrylate.

Cellulose esters suitable for the purposes of the invention are obtained in known manner by esterification of cellulose with aliphatic monocarboxylic acid anhydrides, preferably acetic anhydride and butyric anhydride or acetic anhydride and propionic anhydride. The hydrolysis, which is carried out in the crude solution, is controlled by a slight excess of water in such a way that a low hydroxyl value (4 to 25) is obtained. The oxidative bleaching of the cellulose ester isolated from the solution has to be carried out in such a way that no oxidizing agent can be detected in the end product. An aftertreatment with reducing agents may have to be carried out. To determine the OH value, the free hydroxyl groups of the cellulose ester are esterified with acetanhydride in pyridine, the excess anhydride is reacted with water and back-titrated (procedure: C.J. Mahn, L.B. Genung and R.F. Williams, Analysis of Cellulose Derivatives, Industrial and Engineering Chemistry, Vol. 14, no. 12, 935-940 (1942)).

The viscosity of the cellulose ester should be between 0.3 and 0.5 poise, as measured on a 20% by weight solution in acetone. In the case of the acetobutyrates, preferred cellulose esters have an acetic acid content of from 17 to 23% by weight and a butyric acid content of from 45 to 50% by weight and, in the case of the acetopropionates, a propionic acid content of from 61 to 69% by weight and an acetic acid content of from 2 to 7% by weight. The OH values are normally between 4 and 25. The average weight averages of the molecular weights $\overline{M}_w$ are between 10,000 and 1,000,000 and preferably between 100,000 and 500,000.

Thermoplastic polyvinyl chlorides suitable for the purposes of the invention are, for example, the commercially available PVC types.

Thermoplastic styrene-acrylonitrile copolymers suitable for the purposes of the invention are copolymers of styrene with, preferably, acrylonitrile which are obtained, for example, by suspension polymerization in the presence of catalysts of the monomers or the mixture of monomers with Mw of from 10,000 to 600,000 (Mw is measured in DMF at C 32 5 g/l and at 20° C.). For literature on this subject, see Beilsteins Handbuch der organischen Chemie, 4th Edition, 3rd Supplement B 1.5, pages 1163–1169, Springer Verlag 1964, H Ohlinger, Polystyrol 1. Teil, Herstellungsverfahren und Eigenschaften der Produkte (Polystyrene, Part 1, Production Methods and Properties of the Products), Springer Verlag (1955).

The films of component 1 may be produced in known manner in accordance with DE-OS No. 25 17 033 (Le A 16 244) or DE-OS No. 25 31 240 (Le A 16 536).

The films of component 1 are matted or textured on one side which is achieved in known manner by extruding a melt of the thermoplastic plastic through a flat sheet die and taking up the melt web onto a matted or textured cooling roller.

The films may also be polished on one side and matted on one side.

The thickness of the films is preferably from 0.2 to 0.8 mm.

To produce the polyurethane layers of components 2 and 3a suitable for the purposes of the invention, it is possible to use both aqueous dispersions of preferably linear polyester polyurethanes which dry to form transparent films and also organic solutions, likewise drying to form transparent films, of preferably linear polyester polyurethanes optionally containing a polyisocyanate of relatively high functionality as crosslinking agent. Suitable polyurethane dispersions are, for example, those based on linear polyester diols, aromatic or aliphatic diisocyanates and optionally the usual chain-extending agents which have been prepared using ionic synthesis components in accordance with the teaching of U.S. Pat. No. 3,479,310 or DE-AS No. 14 95 847. Aqueous dispersions of preferably linear polyester polyurethanes containing carboxylate and sulfonate groups, of the type obtained in accordance with DE-OS No. 28 04 609, are also very suitable. Where organic solutions of preferably linear polyester polyurethanes are used, it is preferred to use solutions of nonionic linear polyester polyurethanes in suitable solvents. These polyurethanes are preferably reaction products of (i) aromatic diisocyanates, such as 2,4- and/or 2,6-diisocyanatotoluene, 4,4'-diisocyanatodiphenylmethane, hexamethylene diisocyanate, isophorone diisocyanate or 1,5-diisocyanatonaphthalene or mixtures thereof with (ii) polyester diols in the molecular weight range (Mw) of from 1000 to 4000, more especially those based on adipic acid and suitable glycols, such as ethylene glycol, 1,4-dihydroxybutane, 1,6-dihydroxyhexane and mixtures thereof and, optionally, (iii) chain-extending agents, for example the glycols just mentioned, the reactants being used in an NCO:OH equivalent ratio of from 0.9:1 to 1:1.1 and preferably of from 0.95:1 to 1:1 and the chain extender or chain extender mixture, if any, being used in a quantity of from 0.1 to 2 moles per mole polyester diol. Suitable solvents for such polyester polyurethanes are, for example, ethyl acetate, butyl acetate, methyl ethyl ketone, methyl isobutyl ketone or mixtures of such solvents. The dispersions of solutions are generally used with a solids content of from 10 to 40 by weight. In many cases, it can be of advantage to incorporate small quantities of a polyisocyanate of relatively high functionality, for example tris-(6-isocyanatohexyl)-buiret, in the above-mentioned solutions to improve the mechanical properties of the polyurethane film ultimately obtained.

The interlayer of component 2 may be applied to the film either continuously by roll coating or knife coating or by screen printing before the decoration is printed on. The quantity in which the dispersion or solution is used is generally gauged in such way as to give dry film thicknesses of from 2 to 80 μm and preferably from 15 to 30 μm.

The interlayer of component 3a is applied by screen printing onto the decorative layer 3.

The interlayers of components 2 and 3a are thermoplastic layers which are completely tack-free at room temperature.

Suitable decorative layers of component 3 consist of lacquers based on polyacrylates or mixtures of polyacrylate and cellulose acetobutyrate or PVC copolymer which contain pigments and/or dyes.

The decorative layers 3 are applied to the polyurethane layer 2 by screen printing.

The thickness of the decorative layers is between 5 and 50 μm.

In context of the present invention, screen printing is understood to be the forcing or inks or lacquers through a screen cloth stretched over a frame of which the meshes are partly closed according to the original. The remaining openings in the screen cloth correspond to the print to be applied.

Suitable epoxy resin layers of component 4 are those of the usual epoxy resins crosslinked with amines or acid anhydrides. The production and crosslinking of such epoxy resins is known from the literature (see Lee Neville, Epoxy Resins).

One example of an epoxy resin suitable for use in accordance with the invention is the reaction product of epichlorohydrin with bisphenol A subsequently hardened with aliphatic polyamine having an NH equivalent of 51. The thickness of the epoxy resin layer 4 is from 2 to 80 μm and preferably from 15 to 30 μm.

The interlayer of component 4 is applied between the decorative color layer 3, respectively the second polyurethane layer 3a, and the substrate or core material by casting or spread coating before the individual layers are compressed.

Bonding to the substrate or core material of wood or aluminium is carried out after hardening of the epoxy resin layer.

In the context of the invention, rigid polyurethane foam is understood to be the foam known for example from, and obtainable in accordance with, DE-PS No. 1 694 138. The foams in question have a compact skin and a porous core which is produced from polyisocyanates, organic compounds containing several reactive hydrogen atoms, blowing agents and additives.

Components 1 to 3 and optionally 3a are combined with the rigid polyurethane foam as substrate or cor material likewise by compression molding of the layers 1 to 3 and optionally 3a with the preformed rigid polyurethane foam layer using the epoxy resin interlayer.

The technical advantages of the laminates according to the invention lie in the fact that decoratively printed laminates may be removed from a compression mold; the decorative print is abrasion-proof; the laminates are easy to make and their property spectrum can be varied over a wide range by suitable choice of the components.

The laminates according to the invention are suitable for the production of skis, surfboards and furniture components.

EXAMPLE

A 500 μm thick film of polycarbonate having a relative viscosity of 1.34 is coated by doctor roll with a 30% solution of a polyester urethane based on tolylene diisocyanate and polyester diol. After evaporation of the solvent, an ink based on acrylate and polyvinyl acetate is applied to the polyurethane layer by screen printing.

The film thus decorated is placed in the mold for the production of skis in such a way that the color layer faces towards the core material and is coated with epoxy resin based on bisphenol A and epichlorohydrin mixed with an aliphatic polyamine in a ratio of 100:70. The core material of wood is then placed on top, another epoxy hardener mixture is applied, etc.

After the laminate has been compression molded at 80 to 90 C., a decorated ski can be removed from the mold, the decoration being protected by its internal location.

EXAMPLE 2

A polycarbonate film is used as the support for the decorative layer of Example 1, the screen printing ink used being based on epoxy resin. Further processing is carried out as in Example 1.

EXAMPLE 3

A polycarbonate film is used as the support for the decorative layer as in Examples 1 and 2. The screen printing ink used is a polyurethane-based ink.

The skis produced in this way are distinguished
(a) by permanently abrasion-resistant decoration,
(b) by the fact that scratched surfaces can be repaired by repolishing without damaging the decoration and
(c) by the extremely high low-temperature impact strength of polycarbonate and the PU coupling layer of component 2, thus avoiding fracture and delamination under extremely severe mechanical stressing at temperatures of down to −20° C.

We claim:
1. Laminates from 5 to 100 mm thick consisting of
   1. a 0.1 to 0.8 mm thick film of a highly transparent thermoplastic plastic,
   2. a polyurethane layer tack-free at room temperature,
   3. a decorative layer,
   4. an epoxy resin layer and
   5. a substrate or core material of rigid polyurethane foam, wood or aluminium.
2. Laminates as claimed in claim 1, characterized in that between the decorative layer 3 and the epoxy resin layer 4 a second polyurethane layer tackfree at room temperature is incorporated.
3. The use of the laminates claimed in claim 1 for the production of skis, surfboards and furniture components.

* * * * *